United States Patent Office 2,732,291
Patented Jan. 24, 1956

2,732,291

LOW VOLATILITY HERBICIDAL COMPOSITIONS

William R. Davie, Pittsburgh, Pa., assignor to Pittsburgh Coke & Chemical Company, Pittsburgh, Pa., a corporation of Pennsylvania No Drawing. Application November 26, 1952, Serial No. 322,828

14 Claims. (Cl. 71—2.6)

This invention relates to new herbicidal esters of a mixture comprising at least three primary saturated octyl alcohols selected from the group consisting of trimethyl pentyl alcohols, dimethyl hexyl alcohols and methyl heptyl alcohols in which the said methyl groups are located in the 3, 4 and 5 carbon atoms, with an aryloxyacetic acid selected from the group consisting of phenoxyacetic acid, 2-methylphenoxyacetic acid, naphthoxyacetic acid and halogenated derivatives thereof, and is more particularly concerned with the mixtures of esters produced by reacting a mixture comprising at least three primary saturated octyl alcohols selected from the group consisting of trimethyl pentyl alcohols, dimethyl hexyl alcohols and methyl heptyl alcohols in which the said methyl groups are attached to the 3, 4 and 5 carbon atoms, with 2,4-dichlorophenoxyacetic acid, 2,4,5-trichlorophenoxyacetic acid, or 4-chloro-2-methylphenoxyacetic acid, and to herbicidal compositions containing such esters as the essential active ingredient.

The invention also comprehends concentrated solvent solutions of such esters, and solutions of such solvent solutions in fuel or diesel oil.

The invention further includes aqueous emulsions prepared from such solvent solutions.

FIELD OF INVENTION

In the past few years, aryloxyacetic acid esters, and in particular, the esters of 2,4-dichlorophenoxyacetic acid, 2,4,5-trichlorophenoxyacetic acid, and 4-chloro-2-methylphenoxyacetic acid have come into prominence as herbicides for the selective control of broad leaf weeds in narrow leaf grains and certain other crops or ornamental plants.

In order to practicably employ aryloxyacetic acid esters, and in particular, the esters of 2,4-dichlorophenoxyacetic acid, 2,4,5-trichlorophenoxyacetic acid, and 4-chloro-2-methylphenoxyacetic acid in herbicidal concentrated solvent solutions, it is vital that the solvent solution have many characteristics in addition to its mere ability to act as a herbicide. These characteristics are as follows:

(1) The concentrated solvent solution must be capable of being stored for long periods at low temperatures without having the ester crystallize out from the solution. If crystallization does occur, redissolution may be difficult. The presence of crystals in the concentrated solvent solution at the time of spraying leads to clogging of the spray equipment, renders accurate control of the distribution of the herbicide very difficult, decreases the effectiveness of a given quantity of herbicidal solution, and generally renders the solution unsatisfactory from a practical standpoint. Any effort to concentrate the solvent solution to as great an extent as possible antagonizes the problem of avoiding crystallization, since the original solution at normal temperatures would be closer to its saturation point. The need for low volatility further complicates this problem in view of the fact that low volatility is generally related to high molecular weight, which in turn is normally accompanied by solidity (high melting point) and limited solubility. A practical solvent solution should contain at least about four pounds of the acid in the form of the ester in a gallon of solution and must remain homogeneous at least down to temperatures of about 0° F.

(2) The solvent solution must be soluble in oils having low aromatic content. Since efficient application of the subject herbicides frequently requires the application of a fuel or diesel oil solution of the herbicide, it is essential that the ester selected have a high solubility in these oils which are generally poor solvents.

(3) It is vital that the ester possess low volatility. High volatility permits drift of the herbicidal vapors to susceptible plants, the injuring of which is not desired. There are, however, practical limits to the selection of a low volatile ester. The difficulty of mere resort to higher molecular weight esters has already been discussed in connection with the cold stability of the concentrated solvent solution, but it should additionally be noted that resort to esters of high molecular weight reduces the acid equivalency of the ester so that a greater weight of ester must be dissolved to make available in the solution a given quantity of the aryloxyacetic acid group. Consequently, mere resort to higher molecular weight esters means that more of a less soluble material must be maintained in solution. The increased cost of the high molecular weight alcohols necessary for the production of high molecular weight esters is another factor which makes it undesirable to resort to the simple expedient of utilizing high molecular weight esters.

(4) Herbicidal solvent solutions should have relatively low specific gravity (the specific gravity should not be too different from the specific gravity of water), so that stable aqueous emulsions can be readily produced. In other words, what is here required is that the specific gravity of the ester itself be very little above 1.2, and that the ester be soluble in a solvent having a specific gravity between 0.8 and 1.0, so that the solution of the ester in the solvent will have a specific gravity approximately equal to 1.0.

OBJECTS

A principal object of this invention is the provision of new herbicidal esters of an aryloxyacetic acid selected from the group consisting of phenoxyacetic acid, 2-methylphenoxyacetic acid, naphthoxyacetic acid, and halogenated derivatives theerof with a mixture comprising at least three primary saturated octyl alcohols selected from the group consisting of trimethyl pentyl alcohols, dimethyl hexyl alcohols and methyl heptyl alcohols in which the said methyl groups are attached to the 3, 4 and 5 carbon atoms, and more especially, the esters of 2,4-dichlorophenoxyacetic acid, 2,4,5-trichlorophenoxyacetic acid, or 4-chloro-2-methylphenoxyacetic acid with the aforesaid mixture of primary saturated branched chain octyl alcohols. Further objects include:

(1) The provision of such esters which have very low vapor pressure, and at the same time, (a) have a relatively high acid equivalency, and (b) are highly soluble in conventional solvents so that concentrated solvent solutions may be prepared, capable of being stored for long periods at low temperatures without having the ester crystallize out from the solution, and if crystallization does occur, the ester will redissolve easily when normal temperatures are restored.

(2) The provision of such esters as aforementioned, which esters are soluble in oils of low aromatic content so that oil solutions of the same may be prepared.

(3) The provision of such esters as aforementioned, concentrated solvent solutions of which will have a specific gravity approximately equal to 1.0, so that stable aqueous emulsions may be prepared from the same.

(4) The provision of such esters as aforesaid, which can be produced by a rapid esterification process.

Further objects will be apparent from the listing of necessary characteristics in addition to mere herbicidal activity given hereinbefore, and the detailed description given hereinafter.

GENERAL DESCRIPTION

These objects are accomplished according to the present invention by the provision of new esters of an aryloxyacetic acid selected from the group consisting of phenoxyacetic acid, 2-methylphenoxyacetic acid, naphthoxyacetic acid, and halogenated derivatives thereof, with a mixture comprising at least three primary saturated octyl alcohols selected from the group consisting of trimethyl pentyl alcohols, dimethyl hexyl alcohols and methyl heptyl alcohols in which the said methyl groups are attached to the 3, 4 and 5 carbon atoms.

These objects are preferably accomplished by the provision of new mixtures of esters of 2,4-dichlorophenoxyacetic acid, 2,4,5-trichlorophenoxyacetic acid, or 4-chloro-2-methylphenoxyacetic acid with a mixture comprising at least three primary saturated octyl alcohols selected from the group consisting of trimethyl pentyl alcohols, dimethyl hexyl alcohols, and methyl heptyl alcohols in which the said methyl groups are attached to the 3, 4 and 5 carbon atoms.

Such esters are compounded with solvents, extenders, wetting agents, other herbicidal materials or the like to form new herbicidal compositions.

The success of the present invention is due to a large extent to the discovery that the aforesaid mixture of primary saturated branched chain octyl esters are unique in that they have (1) low volatility, (2) relatively high acid equivalency, (3) are readily soluble in conventional solvents, which solubility is maintained to an unusual extent at low temperatures, (4) are soluble in oils of low aromatic content, and (5) have a specific gravity very little above 1.2. Consequently, it has been found that the esters of aryloxyacetic acids with a mixture comprising at least three primary saturated octyl alcohols selected from the group consisting of trimethyl pentyl alcohols, dimethyl hexyl alcohols and methyl heptyl alcohols in which the said methyl groups are attached to the 3, 4 and 5 carbon atoms, and in particular, the 2,4-dichlorophenoxyacetic acid, 2,4,5-trichlorophenoxyacetic acid, or 4-chloro-2-methylphenoxyacetic acid esters with the aforesaid mixture of primary saturated branched chain octyl alcohols, have the aforementioned attributes for use as herbicides or for the formation of herbicidal compositions.

EXAMPLES

A more complete understanding of the new products and compositions of this invention may be had by reference to the following illustrative examples of actual operations in accordance with the invention:

Example I

A mixture of primary saturated branched chain octyl esters of 2,4,5-trichlorophenoxyacetic acid with a mixture comprising at least three primary saturated octyl alcohols selected from the group consisting of trimethyl pentyl alcohols, dimethyl hexyl alcohols and methyl heptyl alcohols in which the said methyl groups are attached to the 3, 4 and 5 carbon atoms, may be prepared by heating under reflux with stirring for 45 minutes a mixture of 255.5 (1.0 mol) of 2,4,5-trichlorophenoxyacetic acid, 137 grams of a mixture of primary saturated branched chain octyl alcohols (1.0 mol plus 5% excess), 0.6 milliliters of concentrated sulfuric acid, and 75 milliliters of benzene. Suitable apparatus for performing the reaction may be equipped with a water trap so that the water produced by the reaction between the acid and the mixture of alcohols and which is distilled off together with the refluxing benzene may be withdrawn from the condensate before returning the benzene to the reaction vessel. At the end of this time, the organic acid content determined by titration was 0.3%. The mixture was extracted to remove the sulfuric acid by shaking thoroughly with 200 milliliters of 0.5% sodium hydroxide and then twice with about 200 milliliters of water. After separation of the mixture of esters from the benzene, which may be accomplished by distilling off the more volatile benzene, the material was heated under reduced pressure in an aspirator to about 120° C. The yield of the mixture of esters was 91% of that which theoretically could have occurred, and the analysis of the reaction product showed the presence of 99.5% of the mixture of esters and 0.3% of the acid. The mixture of esters is immiscible with water, but completely miscible with most organic solvents. The mixture of esters has a boiling point of approximately 191° to 193° C. at 1.1 mm. pressure. Attempts to cause this mixture of esters to crystallize have been unsuccessful.

The 2,4-dichlorophenoxyacetic acid ester with a mixture of primary saturated branched chain octyl alcohols may be prepared in the same manner by employing 221 grams of 2,4-dichlorophenoxyacetic acid in place of the 255.5 grams of 2,4,5-trichlorophenoxyacetic acid employed in the above example. This mixture of esters has a boiling point of approximately 182° to 184° C. at 1.1 mm. pressure, and attempts to cause this ester to crystallize have likewise been unsuccessful.

The above procedure, when applied to the production of other esters, such as the tetrahydrofurfuryl and butyl Cellosolve esters, showed significantly slower esterification rates. For example, the tetrahydrofurfuryl ester of 2,4,5-trichlorophenoxyacetic acid, after three hours of reflux, still contained 1.14% of free 2,4,5-trichlorophenoxyacetic acid, and the butyl Cellosolve (butoxy ethanol) ester still contained 0.6% free 2,4,5-trichlorophenoxyacetic acid after one and one-half hours.

The mixture of primary saturated branched chain octyl alcohols employed in the foregoing example was a mixture of primary saturated branched chain octyl alcohols having the general formula: $C_7H_{15}CH_2OH$. The alkyl radical ($C_7H_{15}$) represents a branched chain heptyl radical in which the branching consists in the main of methyl groups located in the 2, 3 or 4 positions of the radical. An illustration of such a mixture of primary saturated branched chain octyl alcohols, as used in the examples herein, is commercially available as Enjay "isooctyl alcohol," having the following typical analysis:

| Test | Typical Analysis | |
|---|---|---|
| | Min. | Max. |
| Specific Gravity @ 20/20, ° C | 0.830 | 0.834 |
| Distillation, C {initial | 180 | |
| {dry point | | 200 |
| Acidity as Acetic acid, percent weight | | 0.003 |
| Water, percent weight | | 0.1 |
| Color, platinum-cobalt | | 25 |
| Sulfur, p. p. m | | 15 |
| Purity, percent [1] | 98.5 | |
| Phthalate Color, platinum-cobalt | | 50 |
| Carbonyl Number, mgm. KOH/gm | | 2 |
| Saponification Number, mgm. KOH/gm | | 1 |
| Odor | (²) | (²) |
| Viscosity, cs. @ 20° C | | 12.8 |

[1] Calculated as octyl alcohol. Molecular weight=130.14.
² Characteristic.

The complete and detailed chemical analysis of this alcohol mixture is not available because of the great difficulty of quantitatively isolating alcohols of such closely related physical and chemical properties. The above mixture will be produced, however, by passing a seven-carbon olefinic hydrocarbon fraction derived from petroleum together with carbon monoxide and hydrogen over conventional cobalt catalysts under conventional temperature and pressure conditions for the Oxo process.

Example II

The mixture of esters of 2,4,5-trichlorophenoxyacetic acid with a mixture of primary saturated branched chain octyl alcohols of Example I may be employed to produce a concentrated solvent solution by dissolving 65.3% by weight of the ester mixture in 28.7% of a high boiling naphtha and then adding 6.0% of an emulsifying agent. Suitable emulsifying agents are nonionic emulsifiers such as those mentioned in the United States patent to Jones, No. 2,390,941, of December 11, 1945. The mixing may be conducted at room temperature. The concentrated solvent solution so prepared is a free flowing liquid even at temperatures below 0° F. The mixture of esters of 2,4,5-trichlorophenoxyacetic acid with a mixture of primary saturated branched chain octyl alcohols of Example I may be used in conjunction with esters of other herbicidal acids to provide a concentrated solvent solution of esters of a plurality of herbicidal acids. For example, 29.2% by weight of the mixture of esters of 2,4,5-trichlorophenoxyacetic acid with a mixture of primary saturated branched chain octyl alcohols of Example I may be mixed with 30.6% of the mixture of esters of 2,4-dichlorophenoxyacetic acid with a mixture of primary saturated branched chain octyl alcohols of Example I, 6.0% of an emulsifying agent, and 34.2% of a high boiling naphtha to provide a suitable concentrated solvent solution of a mixture of herbicidal acid esters.

*Example III*

The concentrated solvent solutions of Example II may be dissolved in an oil solvent such as fuel oil, diesel oil or kerosene by mixing one gallon of the solution in 25 gallons of oil. The mixture is homogeneous, and does not separate when agitation is stopped, after mixing has taken place.

The mixture of oil and solvent solution so prepared may be employed upon stumps, used for dormant applications, and is effective against difficult-to-kill plants. A customary method of application of the above mixture is to apply the same as a spray from a plane, so that 26 gallons of the mixture is applied to four acres.

*Example IV*

The concentrated solvent solutions of Example II may be formed into a herbicidal aqueous emulsion useful for application to weeds and brush. The emulsion may be produced by mixing 3 quarts of the concentrated solvent solution with 100 gallons of water, and agitating slightly to give a uniform emulsion. This emulsion is quite stable and will remain as such with little or no further agitation.

DETAILED DESCRIPTION

The aforementioned necessary characteristics eliminate substantially all known alcohols. Alcohols having less than six carbon atoms do not yield esters possessing sufficiently low volatility. Alcohols having more than ten carbon atoms yield esters which are insufficiently soluble and cause the resulting ester to possess a low acid equivalency. Cycloalkyl, heterocyclic and highly oxygenated alcohols yield esters which are not sufficiently soluble in oil, and are generally high melting. The heptyl, nonyl and decyl alcohols are not sufficiently available to constitute a feasible solution to the problem, even if one or more of them were, in fact, capable of doing so.

With reference to the octyl alcohols, n-octyl alcohol esters are insufficiently soluble at low temperatures, and 6-methyl heptanol-1 appears to be quite similar to n-octyl alcohol.

While 2-ethyl hexanol-1 esters are generally suitable as a satisfactory solution to the subject problem, as has been disclosed in my copending application, Serial No. 321,947, filed of even date herewith, the use of the 2-ethyl hexanol-1 ester of the aforementioned aryloxyacetic acids leaves something to be desired, especially when it is employed with 2,4,5-trichlorophenoxyacetic acid.

A suitable mixture of primary saturated branched chain octyl alcohols is less costly than is 2-ethyl-hexanol-1, and in addition, a small amount of crystallization does occur when a very concentrated solvent solution of the 2-ethyl hexanol-1 ester of 2,4,5-trichlorophenoxyacetic acid is subjected to temperatures of 0° F. for a prolonged period of time, while the same crystallization does not occur when a suitable mixture of primary saturated branched chain octyl alcohols is employed for the esterification.

I have found that no single octanol, with the exception of 2-ethyl hexanol-1, is entirely suitable for the purposes of the subject invention. In accordance with the present invention, I have found that the mixture of primary saturated branched chain octyl alcohols of the present invention produces a herbicidal ester possessing low volatility, coupled with a sufficeintly high acid equivalency, and in addition, is quite soluble in fuel oil, can be produced by a rapid esterification process, will yield concentrated solvent solutions containing at least four pounds per gallon equivalent of herbicidal acids (cold stable solvent solutions containing as much as six pounds per gallon equivalent of herbicidal acids may be produced) from which the ester will not crystallize out upon prolonged storage at temperatures as low as 0° F., and will produce, when emulsified with water, an emulsion of good stability. A mixture of primary saturated branched chain octyl alcohols may contain, in addition to a substantial quantity of the aforesaid essential ingredients, small amounts of other primary saturated branched chain octyl isomers and various primary saturated branched chain $C_7$ and $C_9$ alcohols. The presence of small amounts of normal saturated alcohols, secondary and tertiary alcohols, and unsaturated alcohols, while not desirable, is not unduly harmful, although the presence of such alcohols changes the volatility and acid equivalency of the mixture.

Suitable mixtures of primary saturated branched chain octyl alcohols for use in the present invention are commercially available. The utilization of Enjay "Iso-octyl alcohol" has previously been mentioned by way of example. These mixtures are prepared by the utilization of the conventional "Oxo" process, and alcohol mixtures which will be suitable in the present invention will result when octyl alcohols are produced by the Oxo process from seven-carbon olefinic hydrocarbon fractions derived from petroleum, since when this process is employed to produce alcohols possessing eight carbon atoms in the molecule, mixtures of alcohols will be produced. These alcohols will be branched chain primary alcohols in which a substantial quantity of the branching will consist of methyl groups located on the 3, 4 or 5 carbon atoms of the molecule. In addition, the alcohols produced by this process are usually saturated octyl alcohols, and any unsaturated octyl alcohols which are also produced may be easily saturated by a subsequent hydrogenation operation.

While the utilization of Enjay "Iso-octyl alcohol" illustrates the use of a commercially available mixture of primary saturated branched chain octyl alcohols containing more than three of the required branched chain octyl alcohols, I have found that a mixture containing at least three will give satisfactory results.

The esters produced from a given alcohol and 2,4-dichlorophenoxyacetic acid usually melt 10° to 20° C. lower than the corresponding ester of 2,4,5-trichlorophenoxyacetic acid. The esters produced from a given alcohol and 4-chloro-2-methylphenoxyacetic acid usually melt 20° to 40° C. lower than the corresponding ester of 2,4,5-trichlorophenoxyacetic acid. It can consequently be seen that the problem of forming a highly concentrated cold stable solvent solution is more difficult in relation to 2,4,5-trichlorophenoxyacetic acid than it is with regard to the other acids which are the subject of the present invention, although the problem is a pressing one in regard to all.

That the use of a suitable mixture of primary saturated branched chain octyl esters of aryloxyacetic acids produces herbicidal compositions which are more cold stable than the usual esters, and which are even more cold stable than the 2-ethyl hexanol-1 esters, can be seen from the following information:

Concentrated solvent solutions were prepared from one of the commonly used aromatic solvents, such as methylated napthalene and xylene and the various esters of 2,4,5-trichlorophenoxyacetic acid. These concentrated solvent solutions were prepared to contain the equivalent of four pounds of 2,4,5-trichlorophenoxyacetic acid as the ester per gallon.

The following alkyl esters of 2,4,5-trichlorophenoxyacetic acid did not produce concentrated solvent solutions stable at 0° F. with the above solvents: n-amyl, n-hexyl, methylamyl, methylcyclohexyl, octanol-2 (capryl), n-octyl, di-isobutylcarbinol, n-decyl, n-nonyl, lauryl, methoxy-methoxyethyl and cetyl. All crystallized out appreciably at 0° F.

On the other hand, concentrated solvent solutions prepared from the 2-ethyl hexanol-1 ester and from the mixture of primary saturated branched chain octyl esters of the present invention with the above solvents were stable on storing for a prolonged period, i. e., three weeks, at 0° F.

When concentrated solvent solutions were prepared to contain the equivalent of six pounds of 2,4,5-trichlorophenoxyacetic acid as esters per gallon with the above solvents, the 2-ethyl hexanol-1 ester solution exhibited crystallization when stored at 0° F. for a prolonged period of time, while the solution of a mixture of primary saturated branched chain octyl esters of the present invention did not.

The following table shows the unexpected solubility of the mixture of primary saturated branched chain octyl esters of 2,4,5-trichlorophenoxyacetic acid in common kerosene in relation to other esters of 2,4,5-trichlorophenoxy acetic acid:

Table I

| Ester of 2,4,5-trichlorophenoxyacetic acid | Solubility in kerosene at 25° C. |
|---|---|
| n-amyl [1] | miscible. |
| n-hexyl [1] | Do. |
| 2-ethylbutyl [1] | Do. |
| octanol-2 (capryl) | 5 to 10%. |
| n-octyl | 5 to 10%. |
| n-decyl | 5 to 10%. |
| di-isobutylcarbinol | 5 to 10%. |
| lauryl | 5 to 10%. |
| cetyl | 5 to 10%. |
| 2-ethylhexanol-1 | miscible. |
| mixture of primary saturated branched chain octyls | Do. |

[1] Unduly volatile.

In accordance with conventional practice, the herbicidal aryloxyacetic acid esters of the present invention may be used alone or in conjunction with one another, as well as in admixture with other herbicidal ingredients. For example, the ester of 2,4,5-trichlorophenoxyacetic acid with the alcohol mixture of the present invention may be used in admixture with either the esters of the present invention or other ester of either 2,4-dichlorophenoxyacetic acid or 4-chloro-2-methylphenoxyacetic acid, and the esters of 2,4-dichlorophenoxyacetic acid or 4-chloro-2-methylphenoxyacetic acid, and the esters of 2,4-dichlorophenoxyacetic acid and 4-chloro-2-methylphenoxyacetic acid may be used in admixture, a 1:1 ratio of the esters of the present invention of 2,4,5-trichlorophenoxyacetic acid and 2,4-dichlorophenoxyacetic acid being illustrative.

Suitable solvents which may be employed for the purpose of compounding a concentrated solvent solution with the new esters of the subject invention are water insoluble or nearly water insoluble ketones such as di-isobutyl ketone and the like, water insoluble or nearly water insoluble esters such as dibutyl phthalate, amyl acetate and the like, high boiling petroleum naphthas within the boiling range of about 100° to about 400° C. (the common petroleum naphthas that are generally used boil in the range of from 150° to 300° C.), kerosene or other hydrocarbon oils such as methylated naphthalene and xylene. Co-solvents such as dimethyl ketone and isopropyl alcohol may be employed, but it should be noted that the use of water-soluble co-solvents decreases the efficiency of emulsification of the concentrates. Suitable emulsifying agents have been previously referred to, and common nonionic emulsifiers which are commercially available, such as derivatives of polyoxyethylene, are generally used. Spreading agents and adhesives may also be employed, but because of the ability of the esters of the present invention to spread by themselves and resist washing off, these agents are not necessary.

The concentration of the herbicidal agent in the solvent may vary greatly, e. g., 5% to 95%, and still realize herbicidal activity. However, practicable solutions must be highly concentrated, and should contain at least approximately four pounds of the herbicidal acid as the ester per gallon of total solution of the ester in the solvent.

In the preparation of oil-base sprays, about one to six gallons of the concentrated solvent solution are employed to 20 gallons of oil.

Aqueous emulsions of the solution generally contain from one to 25 quarts of the solution for each 100 gallons of water. In such aqueous emulsions, ion sequestering agents, such as ethylene diamine tetra-acetic, citric or glycollic acids or the like, may be employed, particularly when hard water is used. Emulsifying agents may also be employed.

I believe that the ease of dissolving, and perhaps to some small extent, the solubility of various esters, depends on the physical state of the ester in question. Thus, esters that are liquid at a particular temperature are considerably easier to dissolve at that temperature and appear to show higher solubility than a very closely related compound which is solid at that temperature. If the cold stability of a four-pound composition, as discussed previously, and the kerosene solubility, as discussed in Table I, are considered in the light of the melting points of the 2,4,5-trichlorophenoxyacetic acid esters listed in Table II, it will be seen that the mixture of primary saturated branched chain octyl esters of the present invention has a surprisingly lower melting point than the amyl, hexyl and 2-ethylbutyl esters which are themselves unsatisfactory for the purpose of the present invention because of high volatility, and is even more favorable than that of the 2-ethyl hexanol-1 ester.

Table II

| Ester | Approximate Melting Point, °C. |
|---|---|
| n-amyl | 15 |
| n-hexyl | 26 |
| methyl amyl | 40 |
| octanol-2 (capryl) | 34 |
| 2-ethylhexyl | 12 |
| di-isobutylcarbinol | 54 |
| n-nonyl | 43 |
| n-decyl | 40 |
| lauryl | 48 |
| cetyl | 57 |
| mixture of primary saturated branched chain octyl alcohols | ([1]) |

[1] Could not be crystallized at −20° C.

Vapor pressure determinations have shown that the subject herbicidal esters prepared from the mixture of primary saturated branched chain octyl alcohols have volatilities approximately equal to those prepared from tetrahydrofurfuryl alcohol and butoxy ethanol which are in common commercial use today.

Table III

| Ester of 2,4-dichlorophenoxyacetic acid | Vapor pressure in microns | |
|---|---|---|
| | 60° C. | 70° C. |
| tetrahydrofurfuryl | .2 | .5 |
| mixture of primary saturated branched chain octyls | .2 | .7 |
| butoxy ethyl | .3 | .7 |

In addition to these physical tests, severe biological tests have shown that the esters prepared from a mixture of primary saturated branched chain octyl alcohols possess volatility comparable to tetrahydrofurfuryl, butoxy ethyl and butoxy propyl esters, and further, the esterification rate for the mixture of primary saturated branched chain octyl esters is decidedly more favorable, the esterification being conducted in conventional and well known manner.

I claim:

1. A herbicidal composition characterized by its cold stability comprising a solution of a herbicidal mixture of esters in an organic, substantially water-insoluble solvent, said mixture being present in concentration sufficient to provide at least four pounds of equivalent acid as the ester per gallon of solution and being produced from (1) at least one aryloxyacetic acid selected from the group consisting of 2,4-dichlorophenoxyacetic acid, 2,4,5-trichlorophenoxyacetic acid and 4-chloro-2-methyl-phenoxyacetic acid and (2) a mixture containing a substantial quantity of each of at least three primary saturated octyl alcohols selected from the group consisting of trimethyl pentyl alcohols, dimethyl hexyl alcohols and methyl heptyl alcohols, in which said methyl groups are attached to the 3, 4, and 5 carbon atoms.

2. A cold stable herbicidal concentrated solvent solution as recited in claim 1 wherein said mixture of esters is produced from 2,4-dichlorophenoxyacetic acid.

3. A cold stable herbicidal concentrated solvent solution as recited in claim 1 wherein said mixture of esters is produced from 2,4,5-trichlorophenoxyacetic acid.

4. A cold stable herbicidal concentrated solvent solution as recited in claim 1 wherein said mixture of esters is produced from 4-chloro-2-methylphenoxyacetic acid.

5. A herbicidal composition comprising an aqueous emulsion of a mixture of esters dissolved in an organic, substantially water-insoluble solvent, said mixture being present in concentration sufficient to provide at least four pounds of equivalent acid as the ester per gallon of solution and being produced from (1) at least one aryloxyacetic acid selected from the group consisting of 2,4-dichlorophenoxyacetic acid, 2,4,5-trichlorophenoxyacetic acid and 4-chloro-2-methyl-phenoxyacetic acid and (2) a mixture containing a substantial quantity of each of at least three primary saturated octyl alcohols selected from the group consisting of trimethyl pentyl alcohols, dimethyl hexyl alcohols and methyl heptyl alcohols, in which said methyl groups are attached to the 3, 4, and 5 carbon atoms.

6. A herbicidal composition according to claim 1 wherein said solvent has a specific gravity between 0.8 and 1.0.

7. A herbicidal composition according to claim 1 wherein said solvent is a high-boiling naphtha.

8. A herbicidal composition according to claim 1 wherein said solvent is kerosene.

9. A herbicidal composition according to claim 1 including an oil of low aromatic content.

10. A herbicidal composition according to claim 9 wherein said oil is fuel oil.

11. A herbicidal composition according to claim 9 wherein said oil is diesel oil.

12. A herbicidal mixture of esters characterized by its low volatility and cold stability when in solution, said mixture being the esters of (1) 2,4,5-trichlorophenoxyacetic acid and (2) a mixture containing a substantial quantity of each of at least three primary saturated octyl alcohols selected from the group consisting of trimethyl pentyl alcohols, dimethyl hexyl alcohols and methyl heptyl alcohols, in which said methyl groups are attached to the 3, 4 and 5 carbon atoms.

13. A herbicidal mixture of esters characterized by its low volatility, said mixture being the esters of (1) 2,4,5-trichlorophenoxyacetic acid and (2) a mixture containing a substantial quantity of each of at least three primary saturated octyl alcohols selected from the group consisting of trimethyl pentyl alcohols, dimethyl hexyl alcohols and methyl heptyl alcohols, in which said methyl groups are attached to the 3, 4 and 5 carbon atoms.

14. A cold stable herbicidal concentrated solvent solution as recited in claim 1, wherein said mixture of esters is present in a concentration sufficient to provide 6 pounds of equivalent acid as the ester per gallon of solution.

References Cited in the file of this patent

UNITED STATES PATENTS

| 2,614,919 | Warren et al. | Oct. 31, 1952 |
| 2,625,527 | Smith et al. | Jan. 31, 1953 |

OTHER REFERENCES

"Chemical Industries," Aug. 1948, page 211.

Bennett: "Concise Chemical and Technical Dictionary" (1947), page 523.

Mellan: "Industrial Solvents," 2nd edition (1950), page 258.